United States Patent
Huang et al.

(10) Patent No.: US 12,126,256 B2
(45) Date of Patent: Oct. 22, 2024

(54) CONTROL CIRCUIT AND AC-DC POWER SUPPLY APPLYING THE SAME

(71) Applicant: SILERGY SEMICONDUCTOR TECHNOLOGY (HANGZHOU) LTD, Zhejiang (CN)

(72) Inventors: Qiukai Huang, Zhejiang (CN); Jiandong Dai, Zhejiang (CN)

(73) Assignee: SILERGY SEMICONDUCTOR TECHNOLOGY (HANGZHOU) LTD, Zhejiang (CN)

( * ) Notice: Subject to any disclaimer, the term of this patent is extended or adjusted under 35 U.S.C. 154(b) by 186 days.

(21) Appl. No.: 17/838,650

(22) Filed: Jun. 13, 2022

(65) Prior Publication Data
US 2022/0399808 A1    Dec. 15, 2022

(30) Foreign Application Priority Data
Jun. 15, 2021    (CN) .......................... 202110662333.0

(51) Int. Cl.
*H02M 1/14* (2006.01)
*H02M 1/00* (2006.01)
(Continued)

(52) U.S. Cl.
CPC ....... *H02M 1/4225* (2013.01); *H02M 1/0025* (2021.05); *H02M 1/14* (2013.01); *H02M 3/156* (2013.01); *H02M 7/06* (2013.01)

(58) Field of Classification Search
CPC .......... H02M 1/12; H02M 1/32; H02M 1/322; H02M 3/3155; H02M 3/158;
(Continued)

(56) References Cited

U.S. PATENT DOCUMENTS

| 5,764,039 | A | * | 6/1998 | Choi ................... H02M 1/4225 323/222 |
| 9,588,532 | B2 | * | 3/2017 | Rahimi ............... H02M 3/1588 |

(Continued)

FOREIGN PATENT DOCUMENTS

| CN | 202406012 U | 8/2012 |
| CN | 103887824 A | 6/2014 |

(Continued)

OTHER PUBLICATIONS

Ming et al., "A Scheme for Suppressing DC Ripple Current of Cascade Converter for Energy Storage System", Transactions of China Electrotechnical Society; vol. 29, No. 2; Feb. 2014; pp. 46-54.
EPO Extended European Search Report for Application No. 22178920. 9; Issued Oct. 21, 2022.

*Primary Examiner* — Jeffrey A Gblende
(74) *Attorney, Agent, or Firm* — CANTOR COLBURN LLP

(57) ABSTRACT

A control circuit and an AC-DC power supply are provided. A ripple reference signal characterizing an industrial frequency ripple component of an output voltage is added to a reference voltage of a desired output voltage, so that a reference and a feedback voltage of the output voltage are almost the same at the industrial frequency band. In addition, a voltage compensation signal outputted by an error compensation circuit does not include the industrial frequency ripple component, and the voltage compensation signal without the industrial frequency ripple component does not affect a tracking reference of the current loop. Therefore, the loop can be designed without considering limit of the industrial frequency on a cut-off frequency of the loop, thereby effectively increasing the cut-off frequency of the loop and improving a dynamic response speed of the loop.

18 Claims, 1 Drawing Sheet

(51) Int. Cl.
*H02M 1/42* (2007.01)
*H02M 3/156* (2006.01)
*H02M 7/06* (2006.01)

(58) Field of Classification Search
CPC ......... H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; H02M 1/14; G05F 1/30; G05F 1/33; G05F 1/32; G05F 1/34; G05F 1/38; G05F 1/52; H02J 7/12
See application file for complete search history.

(56) References Cited

U.S. PATENT DOCUMENTS

| | | | |
|---|---|---|---|
| 9,595,866 B2* | 3/2017 | Choi | H02M 3/156 |
| 9,729,058 B2* | 8/2017 | Larosa | H02M 3/156 |
| 9,900,938 B2* | 2/2018 | Kim | H02J 3/18 |
| 2007/0076450 A1 | 4/2007 | Kumar et al. | |
| 2014/0340061 A1 | 11/2014 | Ueno | |
| 2016/0172977 A1 | 6/2016 | Cai et al. | |
| 2017/0099710 A1 | 4/2017 | Liu | |
| 2018/0331618 A1 | 11/2018 | Engelhardt et al. | |

FOREIGN PATENT DOCUMENTS

| | | |
|---|---|---|
| CN | 204615631 U | 9/2015 |
| CN | 110677024 A | 1/2020 |
| CN | 112713759 A | 4/2021 |
| JP | 2012191810 A | 10/2012 |
| JP | 2018137840 A | 8/2018 |

* cited by examiner

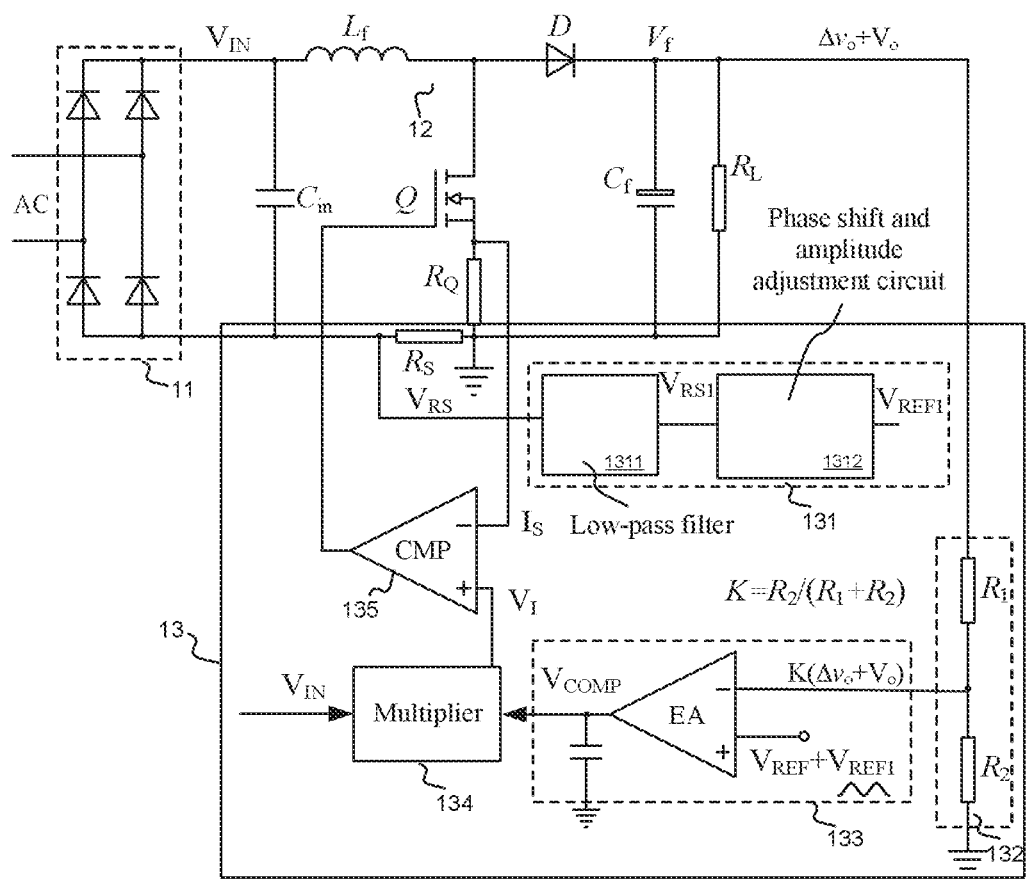

CONTROL CIRCUIT AND AC-DC POWER SUPPLY APPLYING THE SAME

CROSS REFERENCE OF RELATED APPLICATION

The present invention claims priority under 35 U.S.C. § 119 to Chinese Patent Application No. 202110662333.0, titled "CONTROL CIRCUIT AND AC-DC POWER SUPPLY APPLYING THE SAME", filed on Jun. 15, 2021, the disclosure of which is also incorporated herein by reference.

FIELD

The present disclosure relates to the technical field of power electronics, and in particular, to a control circuit and an alternating current-direct current (AC-DC) power supply applying the control circuit.

BACKGROUND

A power factor (PF) is an important energy-saving indicator for various drivers, which not only affects a conversion efficiency of a driver, but also cause the driver to pollute a power grid of an entire power supply system in a case that the PF of said driver is low. Therefore, requirements for power factor correction (PFC) circuits are increasing.

In the conventional Boost PFC circuits, a bandwidth of a control loop is limited by an industrial frequency, resulting in a slow dynamic response speed of the control loop.

SUMMARY

In view of the above, a control circuit and an AC-DC power supply applying the control circuit are provided according to the present disclosure, to solve the problem of slow dynamic response speed of the conventional loop.

According to a first aspect, a control circuit applied to an AC-DC power supply is provided. The control circuit includes a ripple reference signal generation circuit and an error compensation circuit. The ripple reference signal generation circuit is configured to generate a ripple reference signal characterizing an industrial frequency ripple of an output voltage of the AC-DC power supply. The error compensation circuit is configured to compare a sum of a reference signal characterizing a desired output voltage of the AC-DC power supply and the ripple reference signal with a feedback signal characterizing the output voltage of the AC-DC power supply, to generate a voltage compensation signal. The control circuit is configured to generate a control signal for controlling a main power tube of the AC-DC power supply based on the voltage compensation signal.

In an example, the voltage compensation signal excludes an industrial frequency ripple component of the output voltage, so that a control loop is not limited by an industrial frequency and a dynamic response speed of the control loop is improved.

In an example, the ripple reference signal generation circuit performs low-pass filtering on an inductive current sampling signal characterizing a current flowing through an inductor in the AC-DC power supply to obtain a first inductive current sampling signal characterizing the industrial frequency ripple component of the output voltage.

In an example, the ripple reference signal generation circuit is further configured to shift a phase of the first inductive current sampling signal and change an amplitude of the first inductive current sampling signal to obtain an estimated industrial frequency ripple component of the output voltage.

In an example, the ripple reference signal generation circuit is further configured to multiply the estimated industrial frequency ripple component of the output voltage by a voltage division coefficient corresponding to the feedback signal of the output voltage to generate the ripple reference signal. The voltage division coefficient is a ratio of the feedback signal of the output voltage to the output voltage.

In an example, the ripple reference signal generation circuit shifts the phase of the first inductive current sampling signal to cause a lag of 90 degrees.

In an example, the ripple reference signal generation circuit changes an amplitude of the first inductive current sampling signal, to cause amplitude of the estimated industrial frequency ripple component of the output voltage to be directly proportional to a capacitive reactance of an output capacitor of the AC-DC power supply.

In an example, the capacitive reactance of the output capacitor of the AC-DC power supply is a capacitive reactance at a frequency close to twice of the industrial frequency.

In an example, the ripple reference signal generation circuit changes an amplitude of the first inductive current sampling signal, to cause amplitude of the estimated industrial frequency ripple component of the output voltage to be inversely proportional to an impedance of an inductive current sampling resistor.

In an example, the inductive current sampling resistor is connected in series in a current loop flowing through the inductor in the AC-DC power supply.

In an example, the ripple reference signal generation circuit filters the output voltage with different cut-off frequencies to obtain an industrial frequency ripple sampling signal characterizing the industrial frequency ripple component of the output voltage, multiplies the industrial frequency ripple sampling signal by a voltage division coefficient corresponding to the feedback signal of the output voltage to serve as the ripple reference signal. The voltage division coefficient is a ratio of the feedback signal of the output voltage to the output voltage.

In an example, the ripple reference signal generation circuit obtains a real-time value of the output voltage after the output voltage passes through a first filter with a first cut-off frequency, obtains an average value of the output voltage after the output voltage passes through a second filter with a second cut-off frequency, and subtracts the average value from the real-time value to obtain the industrial frequency ripple sampling signal. The second cut-off frequency is less than the first cut-off frequency.

In an example, the control circuit further includes a current reference generation circuit and a pulse width modulation (PWM) generation circuit. The current reference generation circuit is configured to generate a current reference signal based on the voltage compensation signal. The PWM generation circuit is configured to compare a current sampling signal characterizing a current flowing through the main power tube with the current reference signal to generate a PWM signal. The PWM signal serves as a control signal for controlling the main power tube of the AC-DC power supply.

According to a second aspect, an AC-DC power supply is provided. The AC-DC power supply includes a power stage circuit and the control circuit described above.

In the present disclosure, the ripple reference signal characterizing the industrial frequency ripple component of the output voltage is added to the reference voltage of the desired output voltage, so that the reference and the feedback voltage of the output voltage are almost the same at the industrial frequency band. In addition, the voltage compensation signal outputted by the error compensation circuit does not include the industrial frequency ripple component, and the voltage compensation signal without the industrial frequency ripple component does not affect the tracking reference of the current loop. Therefore, the loop can be designed without considering limit of the industrial frequency on the cut-off frequency of the loop, thereby effectively increasing the cut-off frequency of the loop and improving the dynamic response speed of the loop.

BRIEF DESCRIPTION OF THE DRAWINGS

In order to more clearly describe the embodiments of the present disclosure, drawings to be used in the description of the embodiments of the present disclosure or the conventional technology are briefly described hereinafter. It is apparent that the drawings described below are merely used for describing the embodiments of the present disclosure, and additional drawings other than the provided drawings may be provided.

The FIGURE is a structural block diagram of an AC-DC power supply according to an embodiment of the present disclosure.

DETAILED DESCRIPTION OF EMBODIMENTS

The present disclosure is described on the basis of the embodiments hereinafter but is not limited to these embodiments. In the detailed description of the present disclosure hereinafter, numerous specific details are set forth. Those skilled in the art can understand the present disclosure without these specific details. To avoid obscuring the substance of the present disclosure, well-known methods, procedures, processes, elements and circuits are not described in detail herein.

In addition, those skilled in the art should understand that the drawings are provided herein for illustration and are not necessarily drawn to scale.

In addition, it should be understood that in the following description, the term "circuit" indicates a conductive loop formed by at least one element or sub-circuit through electrical connections or electromagnetic connections. When an element or a circuit is described as being "connected to" another element or an element or a circuit is described as being "connected between" two nodes, the element or the circuit is coupled or connected to another element directly or via other element. The elements may be connected physically, logically, or a combination thereof. In addition, when an element is described as being "directly coupled" or "directly connected" to another element, it indicates that there is no element between the two elements.

Unless otherwise stated, the terms "include", "comprise" or any other variations in the specification are intended to be inclusive, rather than exclusive or exhaustive. That is, the terms indicate "including but not limited to".

In the description of the present disclosure, it should be understood that terms "first", "second" and the like are used only for description and cannot be understood as indicating or implying relative importance. In addition, in the description of the present disclosure, "multiple" means two or more unless otherwise stated.

FIG. 1 is a structural block diagram of an alternating current-direct current (AC-DC) power supply according to an embodiment of the present disclosure. In this embodiment, the AC-DC power supply serving as a power factor correction (PFC) circuit is taken as an example. As shown in FIG. 1, the PFC circuit includes a rectifier circuit 11, a power stage circuit 12 and a control circuit 13.

Specifically, the rectifier circuit 11 receives an alternating current input voltage AC, rectifies the alternating current input voltage AC, and outputs a direct current input voltage $V_{IN}$. The rectifier circuit 11 may be a full-bridge rectifier bridge or a half-bridge rectifier bridge. The output of the rectifier circuit 11 may be equivalent to a direct current voltage source.

The power stage circuit 12 includes an inductor (or a transformer), a power switch, a diode and the like. The power stage circuit 12 directly receives the direct current input voltage $V_{IN}$ outputted by the rectifier circuit. By controlling a conduction state of the power switch, an input current and an input voltage of the power stage circuit basically have consistent waveforms and an output voltage of the power stage circuit is basically constant. Here, the power stage circuit 12 is a boost topology. The power stage circuit 12 includes an inductor $L_f$ connected with an input terminal of the power stage circuit, a main power switch Q coupled with the inductor $L_f$, a diode D coupled with a common terminal of the inductor $L_f$ and the main power switch Q, and an output capacitor $C_f$ connected with an output terminal of the power stage circuit to generate an output voltage $V_f$ across the output capacitor $C_f$. The output voltage $V_f$ serves as an input voltage of a converter at a later stage, or directly provides energy for a load.

The control circuit 13 generates a switch control signal based on feedback signals of the output voltage and the inductive current in the power stage circuit 12, to control switch on/off of the power switch in the power stage circuit 12, so that the output voltage $V_f$ is maintained to be closed to an expected value, and the input current and the input voltage of the power stage circuit 12 basically have consistent waveforms.

Compared with the conventional technology, the control circuit 13 estimates an industrial frequency ripple component $\Delta V_O$ of the output voltage $V_f$ by sampling an industrial frequency ripple of the output voltage $V_f$ or based on an industrial frequency inductive current and the like, to obtain a ripple reference signal $V_{REF1}$, and adds the ripple reference signal $V_{REF1}$ to a reference signal $V_{REF}$ characterizing the desired output voltage of the PFC circuit, so that in a case that a bandwidth of a voltage loop in the control loop is greater than a certain frequency (e.g. 100 Hz), the industrial frequency ripple component $\Delta V_O$ of the output voltage $V_f$ is no longer included in a voltage compensation signal $V_{COMP}$ of the voltage loop and the output voltage $V_f$ still includes the industrial frequency ripple component $\Delta V_O$. Therefore, the loop of the voltage loop can be designed based on the switching frequency without considering the industrial frequency. In addition, a closed-loop cut-off frequency may be used to characterize a dynamic response speed of the closed-loop system, and a high closed-loop cut-off frequency leads to a fast dynamic response speed. Therefore, the control circuit according to the present disclosure improves the dynamic response speed of the control loop.

In the embodiments of the present disclosure, the control circuit 13 includes a ripple reference signal generation circuit 131, a feedback circuit 132, an error compensation circuit 133, a current reference generation circuit 134 and a pulse width modulation (PWM) generation circuit 135.

The ripple reference signal generation circuit 131 is configured to generate the ripple reference signal $V_{REF1}$ characterizing the industrial frequency ripple of the output voltage of the AC-DC power supply. The ripple reference signal generation circuit 131 aims to superimpose the generated ripple reference signal $V_{REF1}$ to the reference signal $V_{REF}$ characterizing the desired output voltage of the AC-DC power supply, to cause the voltage compensation signal $V_{COMP}$ not to include the industrial frequency ripple component $\Delta V_O$ of the output voltage $V_f$, so that the control loop is not limited by the industrial frequency, thereby improving the dynamic response speed of the control loop. Here, the output voltage $V_f$ includes the industrial frequency ripple component $\Delta V_O$ and a sum $V_O$ of ripple components at other frequencies and an average value of the output voltage, that is, $V_f = \Delta V_O + V_O$.

In an embodiment, the ripple reference signal generation circuit 131 performs low-pass filtering on an inductive current sampling signal $V_{RS}$ characterizing the current flowing through the inductor $L_f$ in the power stage circuit 12 to obtain a first inductive current sampling signal $V_{RS1}$ characterizing the industrial frequency ripple component of the output voltage. Then, a phase of the first inductive current sampling signal $V_{RS1}$ is shifted and an amplitude of the first inductive current sampling signal $V_{RS1}$ is changed to obtain the ripple reference signal $V_{REF1}$ characterizing the estimated industrial frequency ripple component $V_{REF2}$ of the output voltage.

Referring to FIG. 1, the estimated industrial frequency ripple component $V_{REF2}$ of the output voltage is expressed as:

$$\frac{V_{RS1}}{R_S} \times \left(\frac{1}{2 \times \pi \times f \times C_f}\right) = V_{REF2}. \quad \text{(Equation 1)}$$

Here, $V_{RS1}$ represents the first inductive current sampling signal $V_{RS1}$ obtained by performing low-pass filtering on the inductive current sampling signal $V_{RS}$, $R_S$ represents an inductive current sampling resistance, and f represents a frequency.

After the estimated industrial frequency ripple component $V_{REF2}$ of the output voltage is obtained, a product of the estimated industrial frequency ripple component $V_{REF2}$ of the output voltage and a voltage division coefficient K ($K=R_2/(R_1+R_2)$) in the output voltage feedback circuit 132 serves as the ripple reference signal $V_{REF1}$. Here, the estimated industrial frequency ripple component is superimposed into the reference signal of the desired output voltage in a proportion the same as the voltage division coefficient K in the output voltage feedback circuit 132, so as to match the feedback signal inputted to the error compensation circuit in the voltage loop and the reference signal, thereby obtaining an accurate voltage compensation signal. The voltage division coefficient K is a ratio of the feedback signal of the output voltage to the output voltage. Based on this, the ripple reference signal $V_{REF1}$ is expressed as:

$$V_{REF2} \times K = V_{REF1} = \frac{V_{RS1}}{R_S} \times \left(\frac{1}{2 \times \pi \times f \times C_f}\right) \times K = K_0 * V_{RS1}; \quad \text{(Equation 2)}$$

$$K_0 = \frac{K}{2 \times \pi \times f \times C_f \times R_S}. \quad \text{(Equation 3)}$$

According to the above equations, an amplitude adjustment coefficient $K_0$ of obtaining the ripple reference signal $V_{REF1}$ from the first inductive current sampling signal $V_{RS1}$ may further be obtained.

In an example, in the above equations, f is equal to or close to 100 Hz. The frequency of the alternating current input voltage AC (i.e., industrial frequency) is equal to 50 Hz and the input current of the PFC circuit is required to track the waveform of the input voltage, so that the frequency of the input current of the PFC circuit is also equal to 50 Hz. Therefore, the ripple at the output terminal has a frequency of 100 Hz. Based on this, a capacitive reactance of the output capacitor $C_f$ is mainly considered here in a case of 100 Hz.

Based on the above analysis, in an embodiment, the ripple reference signal generation circuit 131 may include a low-pass filter 1311 and a phase shift and amplitude adjustment circuit 1312.

Specifically, the low-pass filter 1311 is an electronic filtering device that allows a signal having a frequency below a cut-off frequency to pass and does not allow a signal having a frequency higher than the cut-off frequency. The low-pass filter 1311 performs low-pass filtering on the inductive current sampling signal $V_{RS}$ characterizing the current flowing through the inductor $L_f$ in the power stage circuit 12, to obtain the first inductive current sampling signal $V_{RS1}$ characterizing the industrial frequency ripple component of the output voltage. Here, a circuit structure of the low-pass filter 1311 is not limited, as long as low-pass filter at a predetermined cut-off frequency can be realized.

The phase shift and amplitude adjustment circuit 1312 shifts the phase of the first inductive current sampling signal $V_{RS1}$ and change the amplitude of the first inductive current sampling signal $V_{RS1}$ to obtain the ripple reference signal $V_{REF1}$ characterizing the estimated industrial frequency ripple component $V_{REF2}$ of the output voltage. It can be seen from the above equations 2 and 3 that the amplitude adjustment coefficient $K_0$ of obtaining the ripple reference signal $V_{REF1}$ from the first inductive current sampling signal $V_{RS1}$ is obtained, and the phase shift and amplitude adjustment circuit 1312 multiplies the first inductive current sampling signal $V_{RS1}$ by the amplitude adjustment coefficient $K_0$ to obtain the amplitude of the ripple reference signal $V_{REF1}$. Specifically, the amplitude of the estimated industrial frequency ripple component $V_{REF2}$ of the output voltage is directly proportional to the capacitive reactance of the output capacitor $C_f$ of the AC-DC power supply and inversely proportional to the impedance of the inductive current sampling resistance $R_S$. Further, the capacitive reactance of the output capacitor $C_f$ refers to a capacitive reactance of the output capacitor $C_f$ at a frequency close to twice of the industrial frequency.

Further, due to an expression feature of the capacitive reactance of the capacitor, the phase shift and amplitude adjustment circuit 1312 adjusts the phase of the ripple reference signal $V_{REF1}$ to be 90 degrees behind the first inductive current sampling signal. It should be understood that the phase shift and amplitude adjustment circuit 1312 may perform the phase shift and the amplitude adjustment simultaneously, that is, perform the phase shift prior to the amplitude adjustment, or perform the amplitude adjustment prior to the phase shift.

The above embodiment only gives a method for obtaining the ripple reference signal $V_{REF1}$. Any other method with which the ripple reference signal $V_{REF1}$ is obtained and added to the reference signal $V_{REF}$ of the desired output voltage to improve the loop bandwidth of the voltage loop is within the protection scope of the present disclosure.

For example, in another embodiment, the ripple reference signal generation circuit 131 filters the output voltage $V_f$ to obtain an industrial frequency ripple sampling signal $V_{REF3}$ characterizing the industrial frequency ripple component $\Delta V_O$ of the output voltage, and multiplies the industrial frequency ripple sampling signal $V_{REF3}$ by the voltage division coefficient K in the output voltage feedback circuit 132 as the ripple reference signal $V_{REF1}$.

Specifically, the ripple reference signal generation circuit 131 obtains a real-time value of the output voltage by filtering the output voltage $V_f$ through a first filter with a first cut-off frequency, obtains an average value of the output voltage by filtering the output voltage $V_f$ through a second filter with a second cut-off frequency, and subtracts the average value from the real-time value to obtain the industrial frequency ripple sampling signal $V_{REF3}$. The second cut-off frequency is much less than the first cut-off frequency.

The feedback circuit 132 is configured to input the output voltage $V_f$ subjected to proportional conversion to the error compensation circuit 133. Specifically, the feedback circuit 132 includes resistors $R_1$ and $R_2$ that are connected in series. A terminal of the resistor $R_2$ is grounded. A non-grounded terminal of the feedback circuit 132 receives the output voltage $V_f$, and a feedback voltage $V_{FB}$ is outputted at a common node of the resistors $R_1$ and $R_2$, that is, $V_{FB}=K*(\Delta V_O+V_O)$, and the voltage division coefficient is K ($K=R_2/(R_1+R_2)$).

The error compensation circuit 133 is configured to compare the feedback signal $V_{FB}$ characterizing the output voltage $V_f$ of the AC-DC power supply with a sum of the reference signal $V_{REF}$ characterizing the desired output voltage $V_f$ of the AC-DC power supply and the ripple reference signal $V_{REF1}$, that is, $V_{REF}+V_{REF1}$, to generate the voltage compensation signal $V_{COMP}$. The control circuit 13 generates a control signal for controlling the main power switch Q of the AC-DC power supply based on the voltage compensation signal $V_{COMP}$, to improve the dynamic response speed of the control loop. The error compensation circuit 133 includes an error amplifier EA. A positive input terminal of the error amplifier EA receives the sum of the reference signal $V_{REF}$ of the desired output voltage $V_f$ and the ripple reference signal $V_{REF1}$, that is, $V_{REF}+V_{REF1}$, a negative input terminal of the error amplifier EA receives the feedback signal $V_{FB}$ of the output voltage $V_f$ and an output terminal of the error amplifier EA outputs the voltage compensation signal $V_{COMP}$. The output terminal of the error amplifier EA is provided with a compensation capacitor.

Since here the PFC circuit is taken as an example, the current reference generation circuit 134 is configured to multiply the direct current input voltage $V_{IN}$ by the voltage compensation signal $V_{COMP}$ to obtain the current reference signal $V_I$, so that the current sampling signal $I_S$ tracks the waveform of the input voltage $V_{IN}$. In an example, the current reference generation circuit 134 is a multiplier for multiplying the direct current input voltage $V_{IN}$ by the voltage compensation signal $V_{COMP}$, to obtain the current reference signal $V_I$.

The PWM generation circuit 135 is configured to compare the current sampling signal $I_S$ characterizing the current flowing through the main power switch Q with the current reference signal $V_I$ to generate a PWM signal. The PWM signal serves as a control signal for controlling the main power switch Q of the AC-DC power supply. The PWM generation circuit 135 includes a comparator CMP. A non-inverting input terminal of the comparator CMP receives the current reference signal $V_I$. An inverting input terminal of the comparator CMP receives the current sampling signal $I_S$. An output terminal of the comparator CMP outputs a PWM signal. Here, the current sampling signal $I_S$ is obtained through a switch current sampling resistor $R_{S1}$, which is connected between a terminal of the main power switch Q and the ground potential.

According to the present disclosure, the control circuit can improve the cut-off frequency of the control loop by adding the ripple reference signal $V_{REF1}$ characterizing the industrial frequency ripple component $\Delta V_O$ of the output voltage to the reference voltage $V_{REF}$ characterizing the desired output voltage, so that the reference of the voltage loop is expressed as $V_{REF} \pm V_{REF1}$. In this way, the reference and the feedback voltage $V_{FB}=K*(\Delta V_O+V_O)$ of the output voltage are almost the same at the industrial frequency band. In addition, the voltage compensation signal $V_{COMP}$ outputted by the error compensation circuit does not include the industrial frequency ripple component, and the voltage compensation signal $V_{COMP}$ without the industrial frequency ripple component does not affect the tracking reference of the current loop. Therefore, the loop can be designed without considering limit of the industrial frequency on the cut-off frequency of the loop, thereby effectively increasing the cut-off frequency of the loop and improving the dynamic response speed of the loop.

The above descriptions are merely embodiments of the present disclosure and are not intended to limit the present disclosure, and those skilled in the art can make various modifications and variations to the present disclosure. Any modifications, equivalent substitutions and improvements made within the spirit and the principle of the present disclosure are within the protection scope of the present disclosure.

The invention claimed is:

1. A control circuit, applied to an alternating current-direct current (AC-DC) power supply, comprising:
   a ripple reference signal generation circuit, configured to generate a ripple reference signal characterizing an industrial frequency ripple component of an output voltage of the AC-DC power supply; and
   an error compensation circuit, configured to compare a sum of a reference signal characterizing a desired output voltage of the AC-DC power supply and the ripple reference signal with a feedback signal characterizing the output voltage of the AC-DC power supply, to generate a voltage compensation signal;
   wherein the control circuit is configured to generate a control signal for controlling a main power switch of the AC-DC power supply based on the voltage compensation signal;
   wherein the ripple reference signal generation circuit performs low-pass filtering on an inductive current sampling signal characterizing a current flowing through an inductor in the AC-DC power supply to obtain a first inductive current sampling signal characterizing the industrial frequency ripple component of the output voltage.

2. The control circuit according to claim 1, wherein the voltage compensation signal excludes the industrial frequency ripple component of the output voltage.

3. The control circuit according to claim 1, wherein the ripple reference signal generation circuit is further configured to shift a phase of the first inductive current sampling signal and change an amplitude of the first inductive current sampling signal to obtain an estimated industrial frequency ripple component of the output voltage.

4. The control circuit according to claim 3, wherein the ripple reference signal generation circuit is further configured to multiply the estimated industrial frequency ripple component of the output voltage by a voltage division coefficient corresponding to the feedback signal of the output voltage to generate the ripple reference signal, wherein the voltage division coefficient is a ratio of the feedback signal of the output voltage to the output voltage.

5. The control circuit according to claim 1, wherein the ripple reference signal generation circuit shifts the phase of the first inductive current sampling signal with a lag of 90 degrees.

6. The control circuit according to claim 1, wherein the ripple reference signal generation circuit changes an amplitude of the first inductive current sampling signal, such that an amplitude of the estimated industrial frequency ripple component of the output voltage is directly proportional to a capacitive reactance of an output capacitor of the AC-DC power supply.

7. The control circuit according to claim 6, wherein the capacitive reactance of the output capacitor of the AC-DC power supply is a capacitive reactance at a frequency close to twice of the industrial frequency.

8. The control circuit according to claim 1, wherein the ripple reference signal generation circuit changes an amplitude of the first inductive current sampling signal, to cause amplitude of the estimated industrial frequency ripple component of the output voltage to be inversely proportional to an impedance of an inductive current sampling resistor.

9. The control circuit according to claim 8, wherein the inductive current sampling resistor is connected in series in a current loop flowing through the inductor in the AC-DC power supply.

10. A control circuit, applied to an alternating current-direct current (AC-DC) power supply, comprising:
a ripple reference signal generation circuit, configured to generate a ripple reference signal characterizing an industrial frequency ripple component of an output voltage of the AC-DC power supply; and
an error compensation circuit, configured to compare a sum of a reference signal characterizing a desired output voltage of the AC-DC power supply and the ripple reference signal with a feedback signal characterizing the output voltage of the AC-DC power supply, to generate a voltage compensation signal;
wherein the control circuit is configured to generate a control signal for controlling a main power switch of the AC-DC power supply based on the voltage compensation signal;
wherein the ripple reference signal generation circuit filters the output voltage with different cut-off frequencies to obtain an industrial frequency ripple sampling signal characterizing the industrial frequency ripple component of the output voltage, multiplies the industrial frequency ripple sampling signal by a voltage division coefficient corresponding to the feedback signal of the output voltage to serve as the ripple reference signal, wherein the voltage division coefficient is a ratio of the feedback signal of the output voltage to the output voltage.

11. The control circuit according to claim 1, further comprising:
a current reference generation circuit configured to generate a current reference signal based on the voltage compensation signal; and
a pulse width modulation (PWM) generation circuit configured to compare a current sampling signal characterizing a current flowing through the main power switch with the current reference signal to generate a PWM signal, wherein the PWM signal serves as a control signal for controlling the main power switch of the AC-DC power supply.

12. The control circuit according to claim 10, wherein the ripple reference signal generation circuit obtains a real-time value of the output voltage by filtering the output voltage by means of a first cut-off frequency, obtains an average value of the output voltage by filtering the output voltage by means of a second cut-off frequency, and subtracts the average value from the real-time value to obtain the industrial frequency ripple sampling signal, wherein the second cut-off frequency is less than the first cut-off frequency.

13. An alternating current-direct current (AC-DC) power supply, comprising:
a power stage circuit; and
a control circuit applied to the AC-DC power supply;
wherein the control circuit comprises:
a ripple reference signal generation circuit, configured to generate a ripple reference signal characterizing an industrial frequency ripple component of an output voltage of the AC-DC power supply; and
an error compensation circuit, configured to compare a sum of a reference signal characterizing a desired output voltage of the AC-DC power supply and the ripple reference signal with a feedback signal characterizing the output voltage of the AC-DC power supply, to generate a voltage compensation signal;
wherein the control circuit is configured to generate a control signal for controlling a main power switch of the AC-DC power supply based on the voltage compensation signal;
wherein the ripple reference signal generation circuit performs low-pass filtering on an inductive current sampling signal characterizing a current flowing through an inductor in the AC-DC power supply to obtain a first inductive current sampling signal characterizing the industrial frequency ripple component of the output voltage.

14. The AC-DC power supply according to claim 13, wherein the voltage compensation signal excludes the industrial frequency ripple component of the output voltage.

15. The AC-DC power supply according to claim 13, wherein the ripple reference signal generation circuit is further configured to shift a phase of the first inductive current sampling signal and change an amplitude of the first inductive current sampling signal to obtain an estimated industrial frequency ripple component of the output voltage.

16. The AC-DC power supply according to claim 15, wherein the ripple reference signal generation circuit is further configured to multiply the estimated industrial frequency ripple component of the output voltage by a voltage division coefficient corresponding to the feedback signal of the output voltage to generate the ripple reference signal, wherein the voltage division coefficient is a ratio of the feedback signal of the output voltage to the output voltage.

17. The AC-DC power supply according to claim 13, wherein the ripple reference signal generation circuit shifts the phase of the first inductive current sampling signal with a lag of 90 degrees.

18. The AC-DC power supply according to claim 13, the ripple reference signal generation circuit changes an amplitude of the first inductive current sampling signal, such that an amplitude of the estimated industrial frequency ripple component of the output voltage is directly proportional to a capacitive reactance of an output capacitor of the AC-DC power supply.

* * * * *